(12) United States Patent
Jankowksi et al.

(10) Patent No.: US 7,189,471 B2
(45) Date of Patent: *Mar. 13, 2007

(54) SOLID OXIDE MEMS-BASED FUEL CELLS

(75) Inventors: Alan F. Jankowksi, Livermore, CA (US); Jeffrey D. Morse, Martinez, CA (US)

(73) Assignee: The Regents of the University of California, Oakland, CA (US)

(*) Notice: Subject to any disclaimer, the term of this patent is extended or adjusted under 35 U.S.C. 154(b) by 65 days.

This patent is subject to a terminal disclaimer.

(21) Appl. No.: 10/637,914

(22) Filed: Aug. 8, 2003

(65) Prior Publication Data

US 2004/0043273 A1     Mar. 4, 2004

Related U.S. Application Data

(63) Continuation of application No. 09/241,159, filed on Feb. 1, 1999, now Pat. No. 6,638,654.

(51) Int. Cl.
*H01M 8/04* (2006.01)
*H01M 8/12* (2006.01)
*H01M 8/24* (2006.01)

(52) U.S. Cl. .......................... 429/38; 429/30; 429/32; 429/39; 427/115

(58) Field of Classification Search .................. 429/26, 429/30, 32, 33, 34, 38, 39, 40, 44; 427/115
See application file for complete search history.

(56) References Cited

U.S. PATENT DOCUMENTS 5,641,585 A * 6/1997 Lessing et al. ............... 429/26
5,789,093 A * 8/1998 Malhi ........................ 429/34
5,811,062 A   9/1998 Wegeng et al.

(Continued)

FOREIGN PATENT DOCUMENTS

JP         7-201348     *  8/1995

OTHER PUBLICATIONS

Francis Jones et al, Experimental System for the Study of Gas-Solid Heterogeneous Catalysis in Microreactors, Microfluidic Devices and Systems III Proceedings of SPIE Vol. 4177 pp. 124-131.

(Continued)

*Primary Examiner*—Jonathan Crepeau
(74) *Attorney, Agent, or Firm*—Alan H. Thompson; Ann M. Lee; John H. Lee (57) ABSTRACT

A micro-electro-mechanical systems (MEMS) based thin-film fuel cells for electrical power applications. The MEMS-based fuel cell may be of a solid oxide type (SOFC), a solid polymer type (SPFC), or a proton exchange membrane type (PEMFC), and each fuel cell basically consists of an anode and a cathode separated by an electrolyte layer. The electrolyte layer can consist of either a solid oxide or solid polymer material, or proton exchange membrane electrolyte materials may be used. Additionally catalyst layers can also separate the electrodes (cathode and anode) from the electrolyte. Gas manifolds are utilized to transport the fuel and oxidant to each cell and provide a path for exhaust gases. The electrical current generated from each cell is drawn away with an interconnect and support structure integrated with the gas manifold. The fuel cells utilize integrated resistive heaters for efficient heating of the materials. By combining MEMS technology with thin-film deposition technology, thin-film fuel cells having microflow channels and full-integrated circuitry can be produced that will lower the operating temperature an will yield an order of magnitude greater power density than the currently known fuel cells.

64 Claims, 5 Drawing Sheets

U.S. PATENT DOCUMENTS

| | | |
|---|---|---|
| 6,200,536 B1 | 3/2001 | Tonkovich et al. |
| 6,541,676 B1 | 4/2003 | Franz et al. |
| 6,569,553 B1 | 5/2003 | Koripella et al. |
| 2002/0081468 A1 | 6/2002 | Shioya |
| 2002/0094462 A1 | 7/2002 | Shioya et al. |
| 2002/0106540 A1 | 8/2002 | Shioya |
| 2003/0031910 A1* | 2/2003 | Satou et al. .................. 429/30 |
| 2003/0091502 A1 | 5/2003 | Holladay et al. |
| 2003/0190508 A1 | 10/2003 | Takeyama et al. |

OTHER PUBLICATIONS

Ravi Srinivasan et al, Micromachined Reactors for Catalytic partial Oxidation Reactions, AIChE Journal Nov. 1997 vol. 43 No. 11 pp. 3059-3068.

Aleks J. Franz et al, High Temperature Gas Phase Catalytic and Membrane Reactors, Jun. 1999.

Tamara M. Floyd et al, Liquid-Phase and Multi-Phase Microreactors for Chemical Synthesis, Jun. 1999.

* cited by examiner

SOLID OXIDE MEMS-BASED FUEL CELLS

RELATED APPLICATION

This application is a Continuation of application Ser. No. 09/241,159 filed Feb. 1, 1999 now U.S. Pat. No. 6,638,654 and claims priority thereto.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to fuel cells, particularly to small, compact fuel cells, and more particularly to a miniature power source composed of a stack of fuel cells fabricated by combining MEMS and thin film deposition technologies to produce fuel cells with microflow channels, fully-integrated control circuitry, and integrated resistive heaters.

Portable power sources of various types have been under development for many years. A serious need exists for portable power sources with significantly higher power density, longer operating lifetime, and lower cost. Present rechargeable and primary portable power sources have excessive weight, size, and cost with limited mission duration. As an example, batteries covering power range from 1–200 Watts have specific energies ranging from 50–250 Whr/Kg, which represents two to three hours of operation for a variety of commercial and military applications. An alternative power source is the fuel cell which would potentially provide higher performance power sources for portable power applications if the stack structure, packaging, and cell operation were made compatible with scaling down of size and weight.

Fuel cells typically consist of electrolyte materials based on either polymer (proton exchange type) or solid oxide materials, which are sandwiched between electrodes. The fuel cell operates when fuel (usually hydrogen) is delivered to one electrode, and oxygen to the other. By heating the electrode-electrolyte structure, the fuel and oxidant diffuse to the electrode interfaces where an electrochemical reaction occurs, thereby releasing free electrons and ions which conduct across the electrolyte. Typical fuel cells are made from bulk electrode-electrolyte materials which are stacked and manifolded using stainless steel or other packaging which is difficult to miniaturize. These systems are bulky, requiring labor intensive manual assembly, packaging and testing, and in the case of solid oxide materials, typically operate at high temperatures (>600° C.). If the electrode-electrolyte stack can be made very thin and deposited using thin film deposition techniques, the temperature of operation will be significantly lower, and the cost of integration, packaging and manufacturing can be reduced.

Previous efforts at Lawrence Livermore National Laboratory, for example, have demonstrated the synthesis of a thin-film solid-oxide based electrolyte fuel cell. See A. F. Jankowski et al., Mat Res. Soc. Symp. Proc., Vol. 496, pp 155–158, 1998 Material Research Society; and U.S. Pat. No. 5,753,385, issued May 19, 1998 to A. F. Jankowski. In one example, the thin film solid oxide fuel cell (TFSOFC) stack was formed using physical vapor deposition (PVD) techniques. The host substrate used was a silicon wafer covered by a thin layer of silicon nitride. A layer of nickel was first deposited, followed by a layer yttria-stabilized zirconia (YSZ). The conditions during the deposition were adjusted in order to achieve smooth, dense, continuous films, thus, avoiding pinhole formation which could result in electrical shorting through the electrolyte layer. This enables the electrolyte layer to be on the order of 1 µm thick rather than typical thicknesses on the order of >10 µm for bulk solid oxide fuel cells. By thinning the electrolyte layer, the diffusive path for the oxygen ion is shorter and the fuel cell operates at much lower temperatures. A silver electrode layer is deposited on top of the YSZ layer. The deposition conditions of this film are adjusted to create a porous structure so that oxygen can readily diffuse to the electrolyte interface.

The present invention combines an example of thin-film deposition technology, referenced above, with micro-electro-mechanical systems (MEMS) technology to produce a thin-film miniature fuel cell with microflow channels and full-integrated control circuitry, along with integrated resistive heaters for effectively heating the fuel cell such that it will yield and order of magnitude greater power density than any currently known fuel cell. Using this combined technology, thin-film fuel cell stacks can be produced to provide a small, compact miniature power source. The miniature fuel cells of this invention may be either solid oxide or solid polymer or proton exchange membrane electrolyte materials, and may also utilize catalyst layers between the electrodes and the electrolyte.

SUMMARY OF THE INVENTION

It is an object of the present invention to provide a small, compact fuel cell power source.

A further object of the invention is to provide thin-film fuel cells for electrical power applications.

A further object of the invention is to provide MEMS-based thin-film fuel cells.

Another object of the invention is to provide an MEMS-based thin-film fuel cells having microflow channels and integrated resistive heaters and control circuitry.

Another object of the invention is to provide a MEMS-based thin-film fuel cell stack, manifold structure, and fuel reservoir as a miniature portable power source.

Another object of the invention is to provide a MEMS-based thin-film fuel cell capable of utilizing an electrolyte of either a solid oxide, a solid polymer, or a proton exchange membrane material.

Another object of the invention is to provide thin-film fuel cell stack with microflow channels, full-integrated control circuitry, and integrated resistive heaters capable of producing a high power density.

Another object of the invention is to provide a MEMS-based fuel cell which includes electrode catalyst/electrolyte materials which enable the combination of a fuel and oxidant above room temperature to produce continuous electric current.

Another object of the invention is to provide a MEMS-based fuel cell having in the form of a module which can be directly stacked as a means of scaling the power and voltage.

Other objects and advantages of the present invention will become apparent from the following description and accompanying drawings. Basically the invention involves combining MEMS technology and thin-film deposition technology to produce a miniature thin-film fuel cell or fuel cell stack as a portable power source. The MEMS-based fuel cell of this invention may utilize an electrolyte layer which may consist of either a solid oxide, a solid polymer, or a proton exchange membrane material, and may utilize catalyst layers between the electrodes and the electrolyte. The fuel cell includes microflow channels and manifolding micromachined into the host structure/substrate, and may contain a rechargeable microbattery for startup control, and utilize integrated resistive heaters for efficient heating of the stack materials, and may utilize integrated microvalves, resistive heaters, or other means to control the flow of fuel to the fuel cell stack. Furthermore, the fuel cell may exploit the various fuel cell electrode/electrolyte/catalyst materials systems as they are developed such that either direct hydrogen fuel is used, or other liquid hydrocarbon fuels, including methanol or propanol, can be used. Additionally, other structures or materials may be readily integrated with a MEMS-based fuel cell which enable reforming of fuel such that a variety of fuels having high percentage concentrations of hydrogen may be used. The MEMS-based fuel cell may incorporate a fuel reservoir as part of a package approach, or as a modular cartridge which can be easily replaced or recharged. Such a fuel reservoir may simply be a volume containing a liquid if liquid fuels are used, or a volume containing a metal hydride or other material which is capable of storing hydrogen within it. In this case, some form of valve may be placed in the micro-flow channels as a means of controlling the flow of fuel to the stack. Additionally, heating elements may be used to control the flow of hydrogen from the reservoir. The MEMS-based fuel cell modules may be directly stacked on top of each other as a means of scaling voltage and power, or connect fuel cell modules in series on a planar level to do the same. Power transforming circuitry may be utilized to provide the appropriate output voltage and power requirements.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention is a MEMS-based thin-film fuel cell or stack of fuel cells of either a solid oxide fuel cell (SOFC), a solid polymer fuel cell (SPFC), or a proton exchange membrane fuel cell (PEMFC), utilizing electrode/catalyst/electrolyte or electrode/electrolyte materials which enable the combination of a fuel and oxidant at elevated temperatures to produce continuous electric current. Fuel manifolds and microflow channels are formed in the host structure/substrate by MEMS-based technology and the electrode/electrolyte/electrode, with or without catalyst layers are formed along with resistive heaters and integrated control circuitry by thin-film deposition technology and microfabrication approaches in combination with MEMS fabrication techniques. Thus, the invention provides a miniature power source composed of fuel cells which yield zero emissions (when operated on hydrogen and air). The electrical current generated from each cell is drawn away with an interconnect and support structure integrated with the gas manifold. In the present invention, the strengths of microelectronics, fabrication, micromachining approaches, and microelectro-mechanical systems technology are combined with thin-film deposition techniques for the purpose of producing a MEMS-based, thin-film miniature fuel cell. The MEMS-based fuel cell is materials flexible, therefore can utilize either solid oxide, solid polymer, or proton exchange membrane electrolyte materials system.

A fuel cell stack has been fabricated which utilizes thin film electrodes, catalysts, and ion conducting layers deposited by physical vapor deposition techniques. The stack has been patterned with electrical connections using standard microfabrication techniques and subsequently formed into free-standing or supported membranes by micromachining away the silicon substrate. Manifold structures have further been fabricated through silicon micromachining techniques.

Stand-alone, single thin-film solid oxide fuel cells (TFSOFCS) have been synthesized through multilayer and thin film vacuum deposition technology, see A. F. Jankowski et al., referenced above. The present invention provides the ability to design and build a single MEMS-based fuel cell module suitable for assembly into a fuel cell stack. Development of a usable substrate platform for cell stacking is seen in microelectronic processing of, for example, silicon wafers. The Si wafers are patterned using photolithography and etch processing to yield select areas of thin nitride windows that served as the substrate for deposition of the anode-electrolyte-cathode trilayer. Additional approaches can utilize a host structure/substrate having controlled porosity on which the fuel cell electrode/catalyst/electrolyte layers are deposited. This host structure having controlled porosity is then bonded on top of, mechanically sealed to, or formed within the silicon (or other material) substrate through which the flow channels have been etched. A solid oxide fuel cell (SOFC) trilayer example, similar to that shown in FIGS. 1 and 2, has been fabricated based on yttria-stabilized zirconia (YSZ) beginning with deposition of a nickel (Ni) layer and concluding with a silver (Ag) layer. Following deposition of the basic trilayer structure, the nitride window, if present, can be removed by plasma etching or other selective etching techniques. Creation of a multiple cell stack may be pursued, for example, using the Ni-YSZ-Ag trilayers or other solid oxide based trilayers. In this invention the Si-based substrates are used to build the individual TFSOFCs, for example, and use this platform to provide integration of the circuitry, resistive heaters, and required fuel and oxidant manifolding through microflow channel and MEMS fabrication technology. The patterned circuitry provides for controlled power output from each cell as well as a controlled heating of individual fuel cell elements. The MEMS processes allows individual control of gas flow to each cell through use of microvalves as well as control and regulate gas pressure or fuel flow throughout the device. Provision capabilities exist for incorporation of materials for the electrode, catalyst and electrolyte interface that optimize performance at lower temperature by reducing resistive losses along with alternative materials that are suitable for high-temperature internal fuel reforming. The substrate platform enables modular cell assembly providing a capability for servicing and cell upgrade, as well as scaling of voltage.

Figure 1:
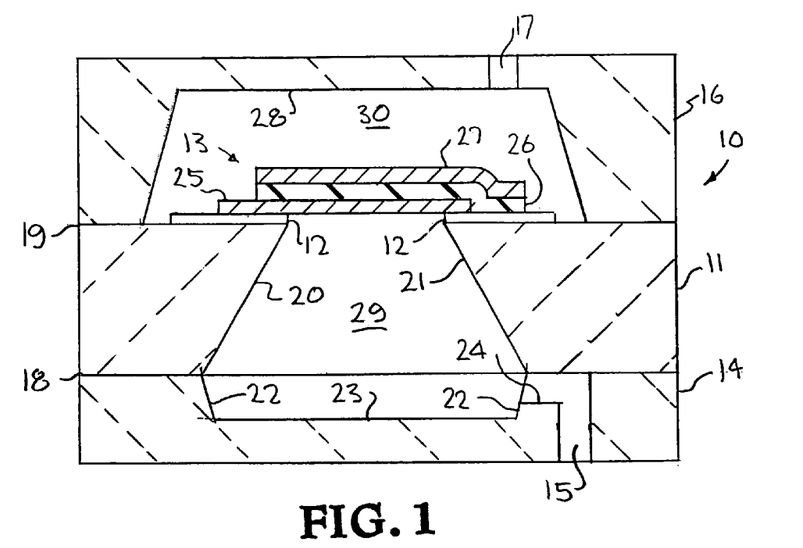
FIG. 1 is a cross-sectioned view of an embodiment of a miniature MEMS-based thin-film fuel cell of the invention.
Figure 2:
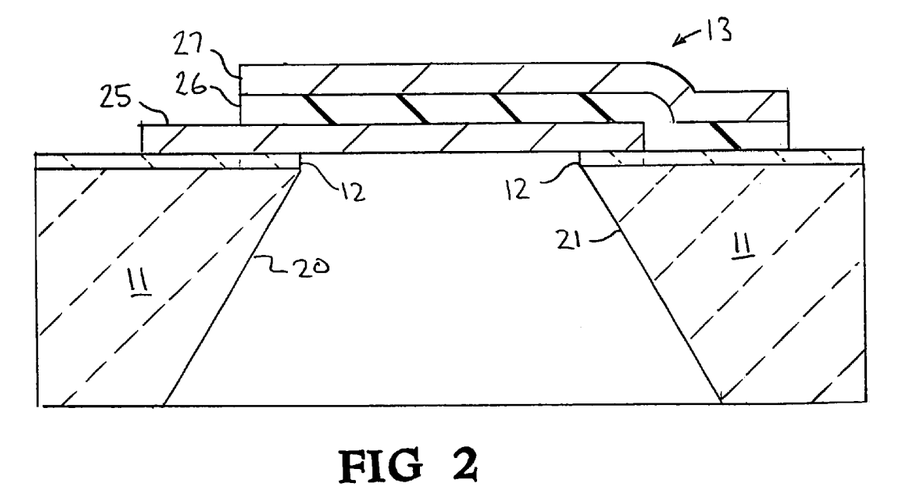
FIG. 2 is an enlarged cross-section of an upper section of the FIG. 1 embodiment.
Figure 3:
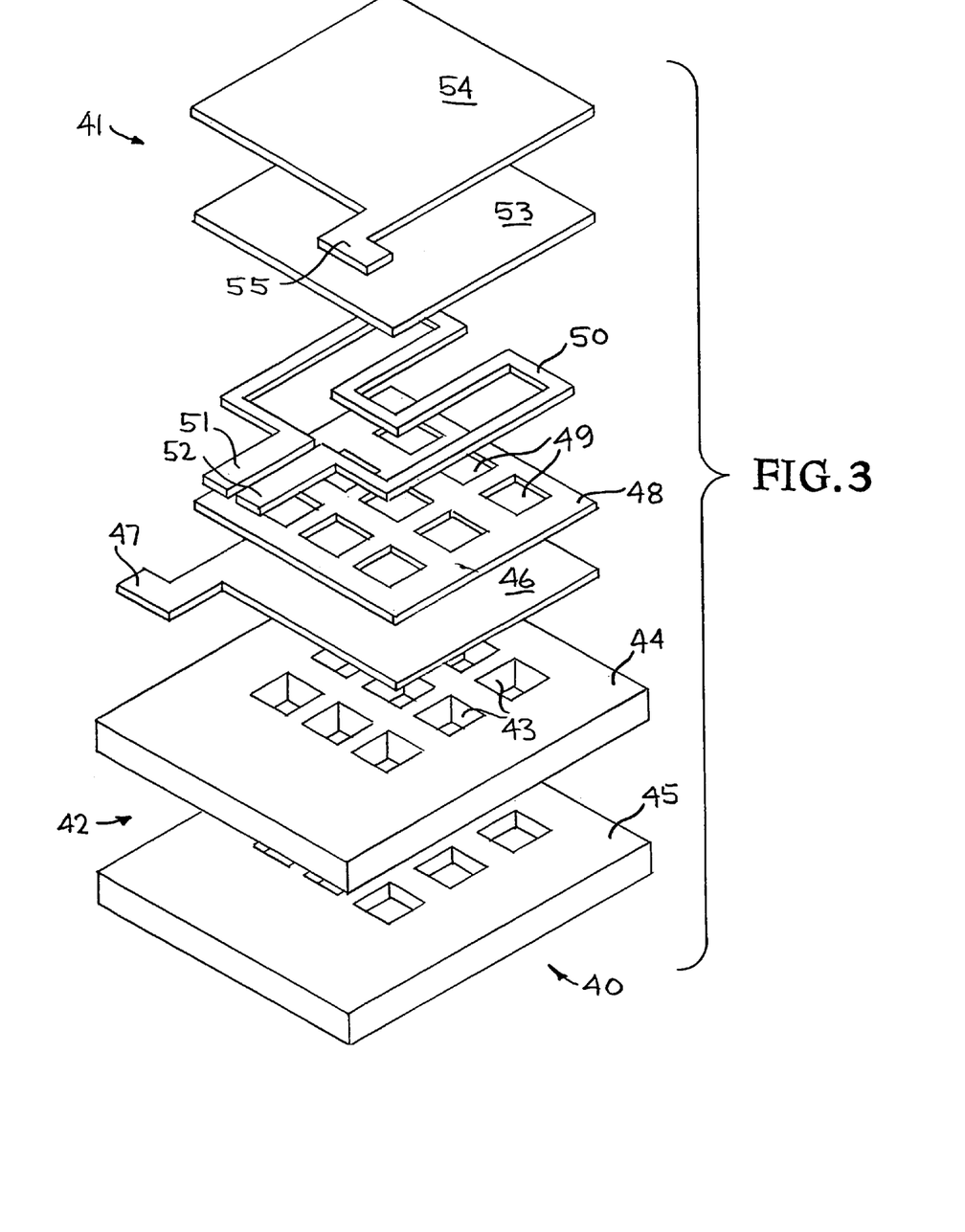
FIG. 3 is an exploded view of another embodiment of the miniature thin-film fuel cell of the invention.

Referring now to the embodiment of FIGS. 1 and 2, FIG. 1 illustrates a fuel cell generally indicated at 10 a host structure or substrate 11 having a nitride layer or other porous membrane 12 on which is deposited electrode-electrolyte-electrode layers (with or without catalyst layers) 13, a substrate 14 having a fuel inlet 15, and a substrate 16 having an oxidant (oxygen) inlet 17. Additionally, if the fuel inlet 15 in substrate 14 and the oxidant inlet 17 in substrate 16 enter from the sides, then the fuel cell modules 10 can be directly stacked on top of each other with fuel and oxidant being supplied through the respective inlets for each module from a common reservoir. In this stacking embodiment, the electrodes for each module are connected in series so as to add the voltage produced by each individual module. The substrates 14 and 16 are bonded or mechanically sealed to host structure 11 as indicated at 18 and 19. As pointed out above, if a nitride layer is used, the central area of the nitride layer 12 is removed following deposition of the electrode-electrolyte-electrode layers 13. The host structure or substrate 11 is provided with a plurality of openings, channels, pores or windows having tapered or straight sides 20 and 21 which approximately align with tapered or straight sides 22 of a cutaway section 23 of substrate 14 which includes a section 24 which communicates with fuel inlet 15. The electrode-electrolyte-electrode layers 13, as seen in FIG. 2, is composed of an electrode (anode or cathode depending on type of electrolyte) 25, an electrolyte layer 26 and an electrode (anode or cathode depending on type of electrolyte) 27, with the bottom electrode providing a continuous coverage of the plurality of open channels, or pores 20 and the electrolyte 26 providing a continuous electrically insulating barrier between the electrodes 25 and 27. The top electrode 27 may step down over the edge of the bottom electrode 25 in order to draw the electrical current off of the substrate 11 to an external circuit. The electrode-electrolyte-electrode layers 13 may be composed of a Ni anode, a YSZ electrolyte and a Ag cathode, or other materials which are typical of the proton exchange membrane, solid oxide, or solid polymer fuel cell construction, such as Carbon bottom electrode, Pt catalyst, Nafion electrolyte, and Pt catalyst/electrode. The substrate 16 is provided with a cutaway section 28 which is in communication with oxidant inlet 17. Thus the opening 20 in substrate 11 and the cutaway section 23 of substrate 14 form a fuel channel 29 in contact with electrode 25, while the cutaway section 28 of substrate 16 forms an oxidant (oxygen) channel 30 in contact with electrode 27. As described above, if the fuel inlet 15 and oxidant inlet 17 enter from the sides of the fuel cell module 10, or in a manner which does not block the inlets, the individual cells 10 can be directly stacked on one another. Furthermore, if the location of the fuel and oxidant inlet channels are offset such that they are easily accessible then fuel can be delivered to the plurality of inlets from a common fuel or oxidant reservoir. Not illustrated in the FIGS. 1–2 embodiment is a heater for the electrolyte layer 26, but, for example, a resistive heater as shown in FIG. 3 may be incorporated into the trilayer 13. The substrates 11, 14 and 16 may be composed of silicon, glass, ceramic, plastic, or any material which has sufficient mechanical strength, can withstand the temperature of operation, and can be micromachined or cast to form manifold channels to deliver fuel and oxidant from an external reservoir. The micromachining methods include those known in the general art and include etching, laser drilling, diamond turning, injection molding, and hot embossing.

As has been shown in FIG. 1, the incorporation of manifold structure within the host substrate through micromachining techniques enables a complete fuel cell device to be realized which can be readily attached to fuel and oxidant sources. FIG. 3 illustrates an exploded view a complete fuel cell stack including the resistive heater, not shown in the FIGS. 1–2 embodiment. In the approach of FIG. 3, the fuel cell generally indicated at 40, includes a membrane-electrode assembly created by thin-film deposition techniques, or a combination of laminate, thin film and thick film assembly techniques and generally indicated at 41, and a micromachined substrate-manifold assembly or system generally indicated at 42. Integrated circuit type microfabrication processes are used to pattern the electrode contacts, as well as to form a resistive heater element within the fuel cell stack structure. The components of the membrane-electrode assembly 41 is subsequently formed into a free standing membrane by selective etching of openings or windows 43 in a substrate 44 on which the components are deposited as in the FIG. 2 embodiment, the substrate 44 being an upper component of the manifold assembly 42. In an alternative embodiment, the components of the membrane-electrode assembly 41 is subsequently formed on a porous thick film membrane or host structure which is positioned over the openings or windows 43 in a substrate 44 on which the components are formed, the substrate 44 being an upper component of the manifold assembly 42. Manifold channels are micromachined in another substrate 45, the lower components of the manifold assembly 42, which is subsequently bonded to the substrate 44. The membrane electrode assembly 41 includes an electrode (anode) 46 having a contact pad 47, a heater isolation member 48 having openings or window 49 which align with openings or windows 43 of substrate 44, a resistive heater 50 having contact pads 51 and 52 and constructed so as not to cover the openings 49 in member 48, an electrolyte 53, and an electrode (cathode) 54 having a contact pad 55. For example, the electrode/electrolyte/electrode (components 46, 53 and 54) may be composed of nickel (Ni)-yttria stabilized zirconia (YSZ)-silver (Ag), the resistive heater 50 composed of platinum, and the heater isolation member 48 composed of silicon dioxide or other material which provides electrical isolation from the electrodes with openings 49 being 2 mm×2 mm, and with the substrates 44 and 45 composed preferably of silicon but may be composed of glass, ceramic, plastic, or other material having the qualities described above, with windows 43 being 2 mm×2 mm.

This approach provides an effective means to form efficient fuel cell stacks and electrode structures monolithically, and distribute fuel to the entire stack without the need for bulky complex manifolding. Furthermore, since the stack is now only a small percentage of the mass of the entire structure, appropriate thermal design of the fuel cell device, package, and resistive heating elements will allow efficient, low power heating of the stacks.

A completely fabricated fuel cell module with an integrated heating element, with the fuel cell stack free standing membranes has been tested. The silicon substrate was selectively etched with potassium hydroxide using patterned silicon nitride as the mask to form the window therein. Manifold channels were etched in a silicon substrate utilizing similar techniques. These components were ultimately bonded together, such as illustrated in FIG. 1, to form a fuel cell module having inlet and outlet channels with approximately 50 μm by 200 μm openings for fuel delivery.

Figure 4:
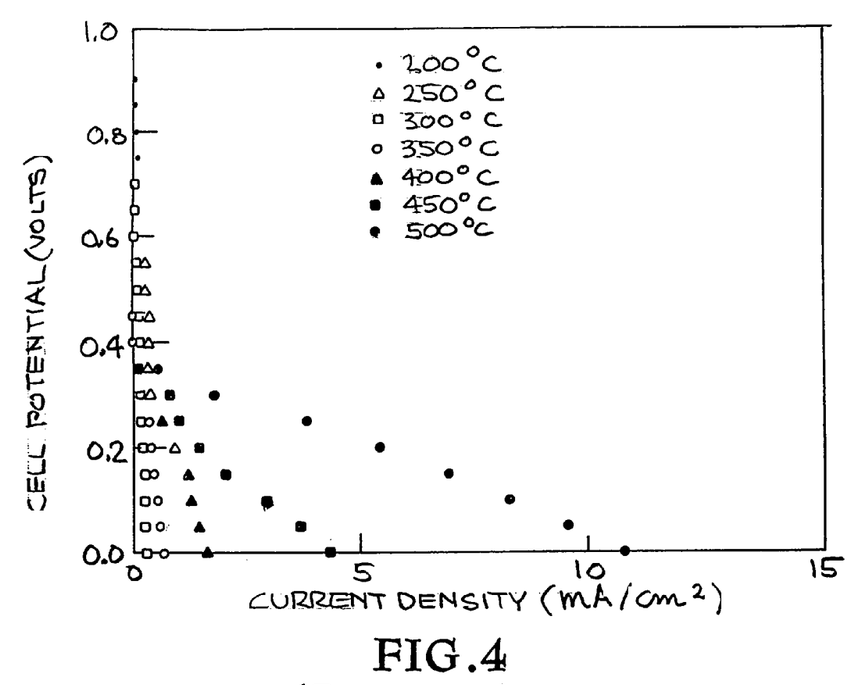
FIG. 4 graphically illustrates results of initial testing of the miniature fuel cell.

Initial testing of fuel cell structures consisted of a glass tube which can be epoxied to the backside of the fuel cell stack to deliver hydrogen gas diluted to 3% concentration with helium. The oxygen source was simply air on the top side of the structure. Bond wires were attached to the anode and cathode electrode pads, and an electrometer was utilized to monitor the potential voltage drop across the stack and subsequent current output as a function of temperature. Initial results of this testing are illustrated in FIG. 4. While not optimal, these results exhibit the expected overpotential for this electrolyte materials system with no output current, along with increasing current output as temperature increases. While the output current densities are low, inherent limitations are present in fuel cell performance resulting from the high density of the nickel electrode layer. Thus, while fuel can readily diffuse through the nickel film to the electrolyte interface, the by-product of the electrochemical reaction, water, is unable to diffuse away from the interface, resulting in limited efficiency of the fuel cell.

The above-discussed problem involving the nickel layer has been overcome by the use of porous nickel electrode structures, thereby eliminating the effects of water vapor trapped at the electrolyte interface. Also, alternate electrolyte materials, such as other solid oxides, solid polymers and proton exchange membrane materials being tested in place of the YSZ electrolyte of the initial tested fuel cells. These improvements are described in greater detail with respect to FIGS. 5 and 6.

Figure 5:
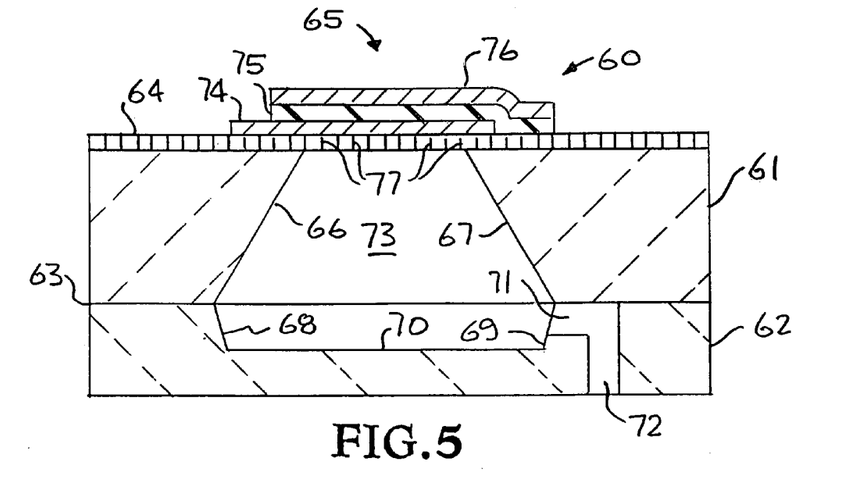
FIG. 5 is a cross-sectional view of another embodiment of the thin-film fuel cell made in accordance with the present invention.
Figure 6:
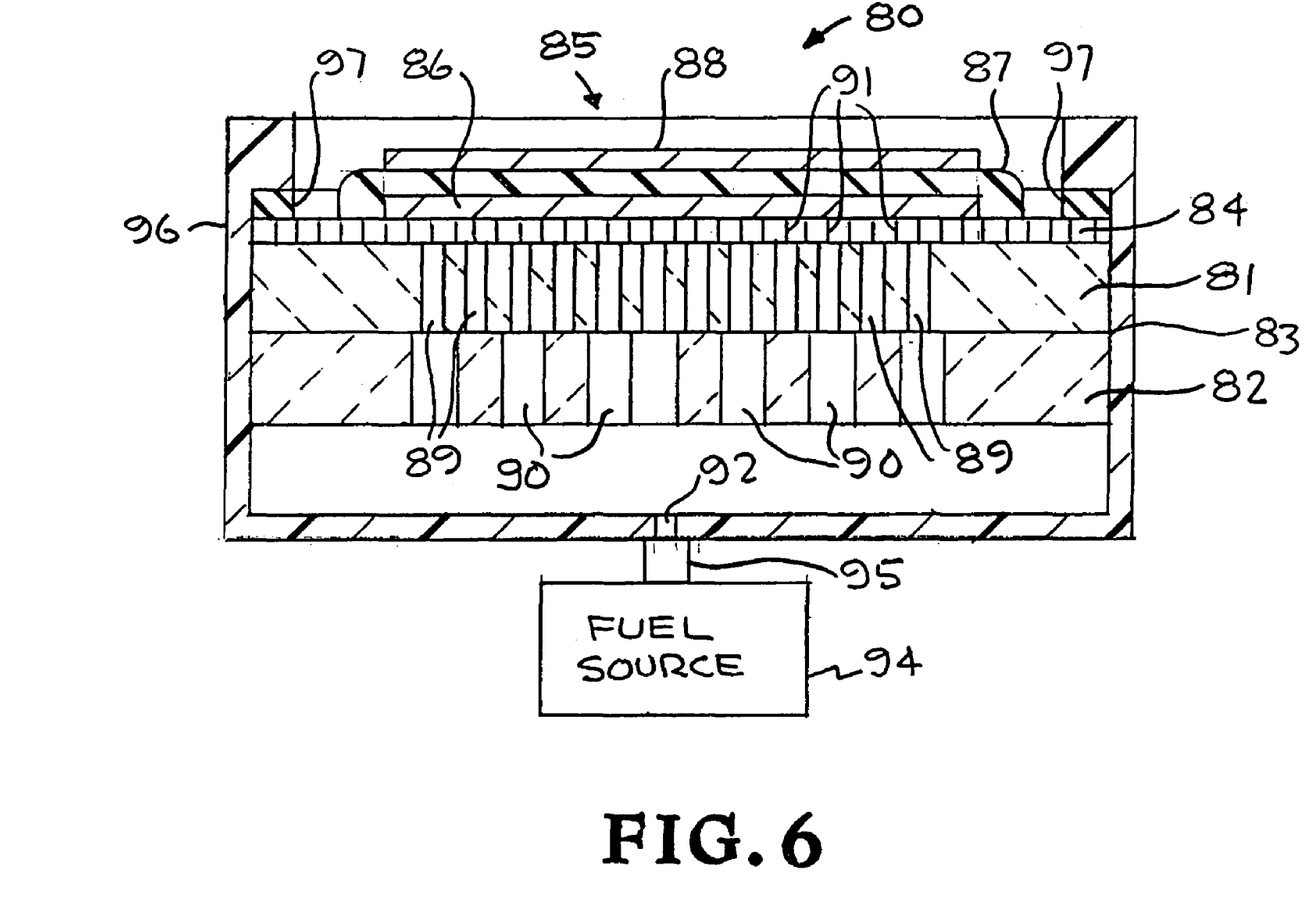
FIG. 6 is a cross-sectional view of another embodiment of the fuel cell using a multiple channel fuel manifold arrangement.

FIGS. 5 and 6 illustrate embodiments of a non-stacked MEMS-based miniature fuel cells, described as being either a solid oxide fuel cell (SOFC), a solid polymer fuel cell (SPFC) or a proton exchange membrane fuel cell (PEMFC), and where air is the oxidant thereby eliminating the oxygen channel and upper substrate 16 of the FIG. 1 embodiment unless stacking of cells is utilized, in which case the embodiment of FIG. 1 including the upper substrate 16 have pores or channel inlets formed to allow the flow of air to the top electrode would be required. The MEMS-based miniature fuel cell of FIG. 5 utilizes electrode/catalyst/electrolyte materials which enable the combination of a fuel and oxidant at elevated temperatures to produce continuous electric current. As pointed out above, the basis of each fuel cell is an anode and cathode separated by an electrolyte layer which can consist, in these embodiments, of either a solid oxide or a solid polymer material, or proton exchange membrane electrolyte materials. Additional layers of catalyst materials can also separate the electrode (cathode or anode) from the electrolyte. In these embodiments micromachined manifolds can be utilized to transport the fuel and oxidant, to each cell and a provide a path for exhaust gases. The electrical current generated from each cell is drawn away with an interconnect and support structure integrated with the gas manifold.

The MEMS-based fuel cell of FIG. 5 consists of three main features. The first two are the substrate host structure on which the fuel cell stack (electrode/electrolyte/electrode) is formed, and in which the manifold structures are formed to deliver the fuel and oxidant to the stack. The substrate can be made of silicon, glass, ceramic, plastic, or any material having the above-described qualities. By utilizing micromachining techniques, the substrate host structure and manifolding for the fuel cell can be made light weight. Furthermore, the manifold structures can be manufactured in a variety of methods using MEMS techniques, including micromachining, injection molding, laser drilling, hot embossing, or diamond machining. As illustrated in FIG. 5, the substrate host structure has two parts, one being a substrate host structure 61 with a plurality of channels or pores through it 73 which transport the gas fuel to the fuel cell stack 65. As described previously, the substrate host structure 61 can be a micromachined substrate formed using the aforementioned techniques, or it can be a porous substrate with pores suitable to allow gas to pass through, as well as complete which can have the fuel cell stack materials deposited on the top side. The second part is a manifold substrate 62 with channels formed in it to transport fuel from one common reservoir, distributing the fuel over the entire area of the channels or pores 73 which deliver fuel to the stack layers. These two parts can be fabricated separately using the techniques cited above, then bonded or mechanically sealed together to form the structure of FIG. 5. A variety of bonding techniques, as used in the art are available, including use of adhesive films or eutectics, or mechanical sealing and packaging techniques so long as they are robust enough through the temperature range of operation, which is in the 50°–500° C. range depending on the electrolyte material used.

Referring now to FIG. 5, the fuel cell stack generally indicated at 60 comprises a micromachined host structure or substrate 61, a micromachined substrate 62 bonded to substrate 61 at 63, a porous thick-film 64 located on the top surface of substrate 61, and an electrode/electrolyte/electrode assembly or fuel cell stack 65 deposited on the porous thick film or member 64. The substrate 61 has a single or plurality of openings, pores or windows defined by tapered or straight surfaces 66 and 67 which approximately align with tapered or straight surfaces 68 and 69 of a cutaway section 70 in substrate 62 which is connected by a cutaway 71 to a fuel inlet 72, with the single or plurality of openings, pores or windows formed by tapered or straight surfaces 66 and 67 and cutaway section 70 forming a micromachined manifold or pore 73. The electrode/electrolyte/electrode assembly or fuel cell stack 65 consists of a thin-film electrode 74, a thin or thick film electrolyte/catalyst 75, and a thin-film electrode 76. The porous film 64 includes numerous pores 77. While not shown the fuel cell stack 65 would include a resistive heater as in FIG. 3 integrated within the porous thick film 64 or fuel cell stack 65.

By way of example, the substrates 61 and 62 are composed of silicon; the porous thick-film 64 is composed of alumina, plastic or porous silicon with a thickness of 10 microns to 200 microns and with pores 77 having a diameter of 200 Å to 5 microns and the film 64 having mechanical strength to support the fuel cell stack 65; the electrode 74 being composed of 18 nickel, carbon, palladium, or platinum with a thickness of 1000 Å to 2 microns; and the electrolyte/catalyst 75 being composed Ni/YSZ, Pt/Nafion, or Pt/C/Nafion with a thickness of 1 micron to 50 microns and the electrode 76 being composed of oxygen catalyzing conducting material, such as Ag, Pt, lanthanum strontium manganate (LSM), or carbon with a thickness of 1000 Å to 2 microns. The micromachined pore or manifold 73 may have a cross-sectional area of 10 μm by 10 μm to 10 mm by 10 mm, with the fuel inlet 72 having a diameter of 25 μm to 1 mm. While the above description specifies examples of fuel cell stack materials known to those familiar with the art, additional combinations can readily be substituted as dictated by performance and compatibility with a MEMS fabrication approach.

The host substrate or structure on which the fuel cell stack is formed has the requirement of having many channels or pores which will enable the fuel, whether it be in gas or liquid form, to transport to the electrode structure. This host structure can be created by selective etching of channels in a silicon substrate, for example, which would result in a free standing fuel cell membrane. This host structure could also be created by etching or molding of the channel features in a variety of other materials as described previously, and can be ceramic, glass, or plastic. This host structure could also be made from a thick film porous material which is bonded on top of the manifold substrate or the channel host structure, as illustrated in FIG. 6. The requirements of the thick film porous structure are that it have enough mechanical strength that it will support the fuel cell stack that can be created on it when positioned over manifold channels or pores of suitable size (0.1–10 mm diameter). Additionally, the pore size must be large enough to provide flow of fuel from the bottom manifolds to the fuel cell stack, but the pores must be small enough that the thin-films which are deposited on top to form the electrode will not deposit down into the pores too deep, so as to completely seal the pores. This issue is less important if a fuel cell membrane electrode assembly in laminate form were bonded, attached or mechanically sealed over the host structure rather than deposited directly onto it. Several materials exist in sheet form which already have the desired porosity characteristics. These include glass plastics, ceramics, or anodized alumina. In the case of the anodized alumina, sheets can be formed which are approximately 50 µm thick which have pore sizes on the order of 0.2 µm, with a small fraction of the structure having pores which are only 0.2 µm diameter. This would allow thin-film deposition on the top side without depositing down into and sealing into the pores, and can be accomplished using a variety of deposition techniques, including sol-gel, or spin cast approaches. Similar structures can be achieved using two porous ceramic materials, or two porous plastic thick films, each having different pore sizes. Again, these materials are readily available from commercial suppliers, or fabricated using techniques reported in the open literature.

As shown in FIG. 6, the fuel cell assembly or device, generally indicated at 80 basically comprises a substrate/host structure 81, a manifold substrate 82 bonded to substrate 81 at 83, a porous thick-film layer 84 located on or within substrate 81, and a thin-film fuel cell stack generally indicated at 85 located on layer 84. The fuel cell stack 85 includes an electrode 86, an electrolyte 87, an electrode 88, and a heater element, not shown, but which may be constructed as in the FIG. 3 embodiment. Alternatively, the heater element may be formed on top of the substrate/host structure 81 or within the porous thick film layer 84, so long as it is electrically isolated from the electrodes 86 or 88. The substrate/host structure 81 includes a number of vertical channels or pores 89 which are in open communication with manifold channels 90 in substrate 82. The porous thick-film layer 84 includes numerous pores 91 which are in open communication with channels 89 of substrate 81. If the porous thick film layer 84 is mechanically strong enough and allows sufficient flow of fuel through to the fuel cell stack 80, it can be directly bonded or mechanically sealed to the manifold substrate 82 with pores 91 in open communication with manifold channels 90. The substrate 82 includes an opening or passageway forming a fuel inlet not shown in the FIG. 6, but similar to the fuel inlet 72 of FIG. 5, in open communication with the plurality of manifold channels 90, which is adapted to be connected to a fuel source 94 via connector 95. Note that the substrate/host structure 81 is etched such that the porous thick film 84 aligns with the pores 89 of the host structure 81 enabling fuel to flow to the fuel cell stack 80 and preventing fuel from flow elsewhere. Additionally shown in FIG. 6 is a package 96 and seals 97 which enable the manifold substrate 82, host structure/substrate 81 and porous thick film layer 84 supporting fuel cell stack 80 to be assembled and mechanically sealed. If the substrate 82 is positioned such that the pores 90 are in open communication with the bottom portion of the package 96, the package 96 may include an opening or passageway forming a fuel inlet 92 which is adapted to be connected to a fuel source 94 via connector 95.

The third main feature of the MEMS-based miniature fuel cell is the thin film fuel cell stack itself. The series of thin film materials, as illustrated in FIG. 5, for example, are an electrode, a catalyst, an electrolyte, a catalyst, and an electrode. Depending on the particular electrolyte the catalyst layers may not be necessary. The thin film fuel cell stack can be formed by a variety of thin-film deposition techniques including sputter or evaporative techniques, sol-gel, spin cast, dip coating approaches. The individual layer thicknesses may vary from 0.5–50 µm. The stack structure may also be formed using a sheet of the electrolyte material which is then sandwiched between the electrode/catalyst layers forming a membrane electrode assembly component or laminate and attached, bonded or mechanically sealed on a MEMS manifold host structures. The requirements of the electrodes are that they have low resistance, continuous conductivity, and are porous enough for the fuel and oxidant to diffuse through to the catalyst/electrolyte interface where the electrochemical reaction occurs, and allow the byproduct of the reaction to diffuse out of the electrode structure. Electrode materials can be made porous through the techniques, including rf-sputtering, electron beam deposition, or sol-gel processes. The electrodes can also be made porous using photolithographic techniques to etch pores into the metal film. Additionally, the porous electrodes could be created using a porous metallic sheet which could also be used as the porous manifold host structure. The catalyst and electrolyte layers are dense continuous films deposited by the techniques described previously. The electrolyte can be either solid oxide, solid polymer, or proton exchange type materials.

Figure 7:
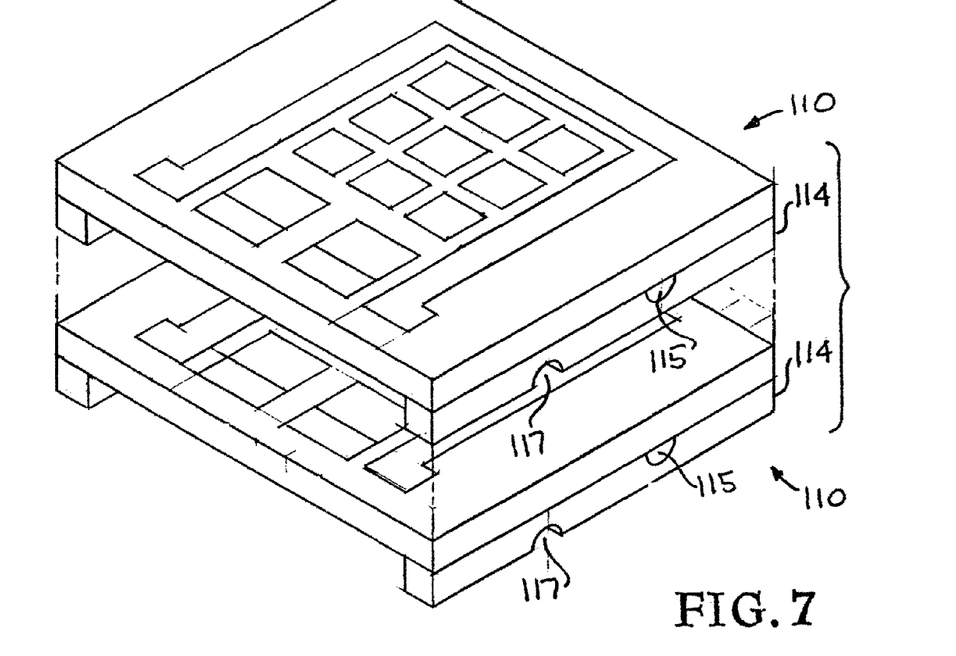
FIG. 7 is a view which illustrates the approach for stacking the MEMS-based fuel cell modules for power and voltage scaling.

FIG. 7 illustrates an embodiment wherein individual cells can be directly stacked on one another. In FIG. 1, the fuel inlet 15 and the oxidant inlet 17 enter from the sides of the fuel cell module 10, or in a manner in which the inlets 15 and 17 remain in open communication with respective flow channels 29 and 30, the individual cells 10 can be directly stacked on one another, as shown in FIG. 7, with the cells indicated a 110, the fuel inlets indicated at 115, and the oxidant inlets indicated at 117. Further, if the location of the fuel and oxidant inlet channels of the cells are offset, as shown in FIG. 7, such that they are easily accessible then fuel can be delivered to the plurality of inlets from a common fuel or oxidant reservoir. Additionally, substrates 14 and 16 of FIG. 1 can be the same substrate, as indicated at 114 in FIG. 7, having appropriate inlets 115 and 117 for fuel and oxidant formed in top and bottom areas of the substrate 114 which have open communication to the appropriate flow channels in order to deliver the fuel to the required electrodes 25 and oxidant to the electrode 27, as seen in FIG. 1. In the case of the oxidant inlet 117, the oxidant or air flow is enabled by forming a channel or pore using micromachining techniques as previously described, or using a material having adequate porosity and mechanical strength which enable ambient flow of air to the electrode. In this stacking embodiment, the electrodes for each module are connected in series so as to add the voltage produced by each individual module. This stacking approach is relevant to all embodiments as described in FIGS. 2, 3, 5 and 6.

Figure 8:
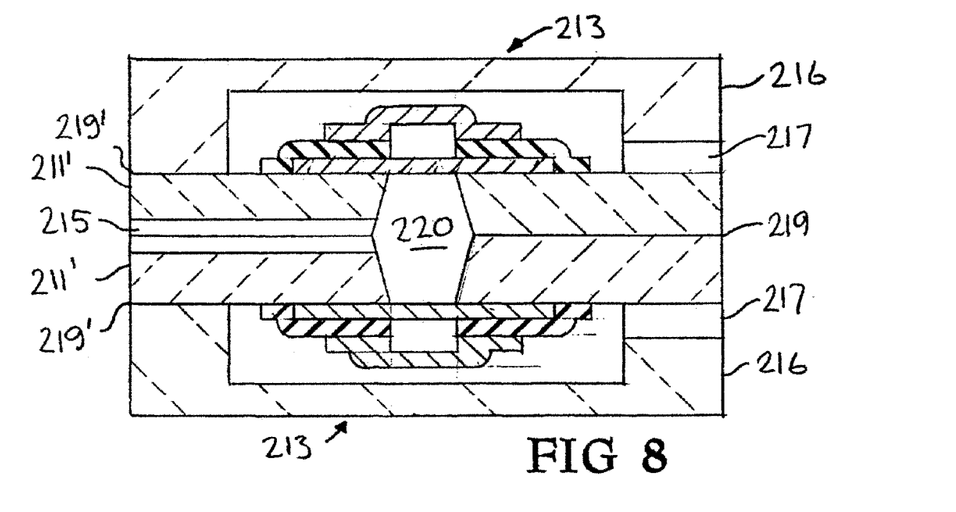
FIG. 8 is a cross-sectional view of another embodiment of the fuel cell enabling the cells to be inverted and bonded in order to deliver fuel to two cells from one common inlet.

An additional embodiment for stacking of MEMS-based fuel cells is illustrated in FIG. 8. In this embodiment, the substrate/host structure 211' having fuel cell electrode/electrolyte stack 213 and single or plurality of openings, channels or pores 220 is now bonded or mechanically sealed as indicated at 219 to a similar substrate/host structure 211 which is positioned upside down as illustrated in FIG. 8 such that a symmetrical structure is formed and a single fuel inlet 215 can now deliver fuel to double the effective fuel cell stack area. The fuel inlet 215 is formed using a cutaway section in communication with the flow channel openings, channels or pores 220. The flow channels and cutaway sections are formed using one or more of the various micromachining techniques as previously described. If additional stacking or packaging is required, another substrate structure 216, similar to the substrate 16 of FIG. 1, is positioned over each fuel cell electrode/electrolyte stack 213 and bonded or mechanically sealed as indicated at 219' to the substrate/host structure 211 and 211' similar to that shown in FIG. 1. This embodiment, as illustrated in FIG. 8, enables each of the fuel cell stacks to have a cavity and oxygen inlet structure 217 formed in said substrate 216 as shown using micromachining techniques. This additionally enables direct stacking of fuel cell modules as previously described and illustrated in FIG. 7.

Finally, an integrated resistive heating element can be utilized to efficiently heat the fuel cell stack without heating the entire host structure and package. The resistive heating element is attached to a rechargeable microbattery located within the package, and is used to turn-on the fuel cell by uniformly heating the fuel cell stack. Once the fuel cell is powered on, the resistive heater draws its power from the operating fuel cell. The resistive heater can be located within the fuel cell stack but will require electrical isolation. The heating element can also be located within the porous host structure and be designed such that the heat is conducted to the fuel cell stack structure, and insulated from the manifold substrate and exterior packaging.

It has thus been shown that the present invention advances the state of the fuel cell art by miniature MEMS-based thin-film fuel cells that will yield an order of magnitude greater power density than any fuel cell currently available. Further the fuel cells of this invention are small and compact and thus offers improved performance over rechargeable batteries as a miniature power source. Since the fuel cell electrolyte layer can be made thinner, e.g. 1–2 µm thick as compared to 1 mil, then the operating temperature (50°–500° C.) can be reduced by hundreds of degrees from the conventional operation temperatures of >600° C. for the case of solid oxide electrolytes. The electrolyte material may be YSZ, a solid oxide or a solid polymer, or a proton exchange membrane. Also, the MEMS-based fuel cells have microflow channels and manifolding micromachined into the host structure/substrate, utilize an integrated thin-film resistive heater for efficient heating of the fuel cell stack, and contain a rechargeable microbattery connected to the heater for startup control.

While particular embodiments have been illustrated and described along with specific materials and parameters, to exemplify and explain the principles of the invention, such are not intended to be limiting. Modifications may become apparent to those skilled in the art, and it is intended that the invention be limited only be the scope of the appended claims.

The invention claimed is:

1. An apparatus comprising:
an anode manifold fabricated from a silicon substrate having a plurality of open pores or channels for delivering fuel from a fuel source;
an anode electrode having an anode electrode material;
a solid oxide electrolyte; and
a cathode electrode having a cathode electrode material, wherein the open pores or channels for delivering fuel from the fuel source include openings defined by edges of the anode manifold fabricated within the silicon substrate, and
the openings extend entirely through a thickness of the silicon substrate.

2. The apparatus of claim 1 further comprising:
a cathode manifold fabricated from a silicon substrate having an open pore or channel for delivering oxidant to the cathode electrode.

3. The apparatus of claim 1, wherein said anode electrode material and said cathode electrode material are porous materials.

4. The apparatus of claim 1, wherein said open pores or channels for delivering fuel to the anode electrode comprise a porous membrane in parallel with and formed over an open channel, pore or a plurality of open channels or pores formed in the silicon substrate.

5. The apparatus of claim 2, wherein said cathode manifold is in open communication with the cathode electrode and the open pore or channel for delivering oxidant from an oxidant source.

6. The apparatus of claim 5, wherein the 6xidant source comprises at least one of air or oxygen.

7. The apparatus of claim 1, wherein the fuel source is selected from the group consisting of gaseous hydrogen, at least one hydrocarbon, and at least one hydrocarbon reformate.

8. The apparatus of claim 1, wherein the fuel source is a liquid hydrocarbon.

9. The apparatus of claim 1, wherein said open pores or channels for delivering fuel to the anode electrode comprise a plurality of channels or pores fabricated in a silicon wafer, wherein the plurality of channels or pores are in open communication with the anode electrode.

10. The apparatus of claim 2, wherein said open pore or channel is fabricated in a silicon wafer and in open communication with the cathode electrode.

11. The apparatus of claim 9, wherein said pores or channels have diameters ranging from 0.1–10 .mu.m.

12. The apparatus of claim 10, wherein said open pore or channel has a diameter ranging from 0.1–10 .mu.m.

13. The apparatus of claim 1, wherein a resistive heater is integrated on the silicon substrate to heat the electrolyte.

14. The apparatus of claim 1, wherein the anode electrode has the capability for directly reforming and/or utilizing a hydrocarbon fuel.

15. The apparatus of claim 1, further comprising: a hydrocarbon fuel reforming device integrated within the silicon anode manifold.

16. The apparatus of claim 1, further comprising at least one of microvalves, microcontroller chips and integrated heaters for flow control of the fuel.

17. The apparatus of claim 1, further comprising: a replaceable fuel cartridge for fuel storage.

18. The apparatus of claim 2, further comprising:
at least one additional apparatus comprising:
an anode electrode support fabricated from a silicon substrate having open pores or channels for delivering fuel to an anode electrode having an anode electrode material;
a solid oxide electrolyte;
a cathode electrode having a cathode electrode material; and
a cathode electrode support fabricated from a silicon substrate having an open pore or channel for delivering oxidant to the cathode,
said apparatuses arranged in a planar configuration by connecting each cathode electrode to the adjacent anode electrode.

19. An apparatus comprising;
an anode manifold fabricated from a silicon substrate having a plurality of open channels or pores for delivering fuel from a fuel source to an anode electrode material;
a solid oxide electrolyte;
a cathode electrode material; and
a cathode manifold fabricated from a silicon substrate having an open channel or pore for delivering oxidant to the cathode electrode to form a fuel cell assembly, wherein
the plurality of open channels or pores for delivering fuel to the anode electrode material comprise openings defined by edges of the anode manifold fabricated within the silicon substrate, and
the openings extend entirely through a thickness of the silicon substrate.

20. The apparatus of claim 19, wherein said anode electrode material and said cathode electrode material include porous materials.

21. The apparatus of claim 19, wherein said open pores or channels for delivering fuel to the anode electrode comprise a porous membrane in parallel with and formed over an open channel, pore or plurality of open channels or pores formed in the silicon substrate.

22. The apparatus of claim 21, wherein said porous membrane comprises silicon.

23. The apparatus of claim 21, wherein said porous membrane comprises alumina.

24. The apparatus of claim 19, wherein said electrolyte is (1) in parallel with said anode manifold and said cathode manifold and (2) contacting said anode electrode on a first side and said cathode electrode on a second side.

25. The apparatus of claim 19, wherein said anode and cathode electrode materialsand said electrolyte layer have thicknesses ranging from 0.5–50 .mu.m.

26. The apparatus of claim 19, wherein the fuel source is selected from the group consisting of gaseous hydrogen, at least one hydrocarbon, and at least one hydrocarbon reformate.

27. The apparatus of claim 19, wherein the fuel source is a liquid hydrocarbon.

28. The apparatus of claim 19, wherein said open pores or channels for delivering fuel from a fuel source comprises a plurality of channels, pores, or flow fields fabricated in a first silicon wafer and an open pore or channel fabricated in a second silicon wafer for delivering oxidant from an oxidant source to the cathode electrode material.

29. The apparatus of claim 19, wherein a resistive heater is integrated on the silicon substrate to heat the electrolyte.

30. The apparatus of claim 19, wherein the anode electrode has the capability of directly reforming and/or utilizing a hydrocarbon fuel.

31. The apparatus of claim 19, further comprising: a hydrocarbon fuel reforming device integrated within the anode manifold.

32. The apparatus of claim 19, further comprising: a replaceable fuel cartridge for fuel storage.

33. The apparatus of claim 19, further comprising:
at least one other fuel cell assembly comprising:
an anode manifold fabricated from a silicon substrate having open channels or pores delivering fuel to an anode electrode material;
a solid oxide electrolyte;
a cathode electrode material; and
a cathode manifold fabricated from a silicon substrate having an open channel or pore for delivering oxidant to the cathode in communication with said first fuel cell assembly to form a fuel cell stack assembly.

34. The apparatus of claim 33, wherein said fuel cells of said fuel cell stack assembly are connected in series on a planar level.

35. An apparatus comprising:
at least one solid oxide fuel cell having
(1) an electrolyte sandwiched between a first and a second electrode and
(2) at least one manifold comprising silicon and having a plurality of open pores or channels for delivering fuel from a fuel source to the first electrode, wherein
the open pores or channels for delivering fuel to the first electrode comprise openings defined by edges of the at least one manifold fabricated within the silicon substrate, and
the openings extend entirely through a thickness of the silicon substrate.

36. The apparatus recited in claim 35, wherein said apparatus comprises at least a first and a second fuel cell and said fuel cells form a fuel cell stack.

37. The apparatus recited in claim 36, wherein the first fuel cell is stacked on the second fuel cell.

38. The apparatus recited in claim 36, wherein said first and second fuel cells are connected in series electrically and said fuel cell stack comprises a planar fuel cell stack.

39. The apparatus recited in claim 35, wherein said first electrode, said second electrode, and said electrolyte each have respective thicknesses selected from the range 0.5 micrometers to 50 micrometers.

40. The apparatus recited in claim 35, further comprising a resistive heater integrated within the manifold.

41. The apparatus recited in claim 35, wherein said manifold defines a channel, said manifold channel having a cross-sectional dimension selected from the range 0.1 millimeters to 10 millimeters.

42. An apparatus comprising:
a first and a second solid oxide fuel cell, each fuel cell comprising
an electrolyte sandwiched between a first and a second electrode; and
a manifold fabricated from a substrate defining a plurality of open pores or channels for delivering fuel from a fuel source to the first electrode, wherein
the first and second fuel cells are stacked in series electrically in a planar configuration with the manifold, and the open pores or channels for delivering fuel to the first electrode comprise openings defined by edges of the anode manifold fabricated within the silicon substrate, and the openings extend entirely through a thickness of the silicon substrate.

43. The apparatus recited in claim 42, wherein said manifold comprises silicon.

44. The apparatus recited in claim 42, wherein each electrolyte and each electrode has a thickness selected from the range of 0.5 micrometers to 50 micrometers.

45. The apparatus recited in claim 42, wherein at least one of the manifold channels comprises a cross-sectional dimension selected from the range 0.1 millimeters to 10 millimeters.

46. The apparatus recited in claim 42, further comprising a resistive heater.

47. A method of forming a fuel cell assembly comprising:
coating a silicon substrate with silicon nitride;
depositing a first electrode onto said substrate;
depositing an electrolyte layer onto said first electrode layer;
depositing a second electrode layer onto said electrolyte layer;
forming a channel, pore or plurality thereof through the backside of the silicon substrate such that it is in open communication with the first electrode layer to form a fuel cell assembly.

48. The method of claim 47, wherein said depositing of said electrode layers is accomplished by physical vapor deposition, chemical vapor deposition, solgel deposition, spin-cast deposition, or combinations thereof.

49. The method of claim 47, wherein said first and said second electrode layers are porous materials.

50. The method of claim 47, wherein said electrolyte layer comprises a solid oxide material.

51. The apparatus recited in claim 35, wherein the electrolyte, the first electrode, the second electrode, and the at least one manifold comprise parallel planar layers.

52. The apparatus recited in claim 35, further comprising: a hydrocarbon fuel reforming device integrated within the at least one manifold.

53. The apparatus recited in claim 42, wherein the electrolyte, the first electrode, the second electrode, and the manifold comprise parallel planar layers.

54. The apparatus recited in claim 42, further comprising: a hydrocarbon fuel reforming device integrated within the manifold.

55. The apparatus of claim 1, wherein
the edges defining the openings include tapered edges extending entirely through a thickness of the silicon substrate.

56. The apparatus of claim 1, further comprising
at least one fuel inlet in open communication with the fuel source and at least one of the plurality of open pores or channels.

57. The apparatus of claim 56, wherein
the fuel inlet is fabricated within the silicon substrate and extends laterally through the anode manifold.

58. The apparatus of claim 2, wherein
the anode electrode includes a plurality of anode electrodes, and
the open pores or channels deliver fuel to respective ones of the anode electrodes.

59. The apparatus of claim 58, wherein
the cathode electrode includes a plurality of cathode electrodes, and a plurality of open pores or channels deliver fuel to respective ones of the cathode electrodes.

60. The apparatus of claim 59, wherein
the plurality of cathode electrodes are connected to respective anode electrodes to form a series connection of anode and cathode electrode pairs.

61. The apparatus of claim 60, wherein
the anode and cathode electrode pairs are arranged in a planar configuration.

62. The apparatus of claim 1, wherein said anode manifold is in open communication with the anode electrode and a plurality of open pores or channels for delivering fuel from a fuel source.

63. The apparatus of claim 1, further comprising a second substrate mechanically sealed and bonded to the silicon substrate to form a cavity there between.

64. An apparatus comprising:
a cathode manifold fabricated from a silicon substrate having a plurality of open pores or channels for delivering oxidant from an oxidant source;
an anode electrode having an anode electrode material;
a solid oxide electrolyte; and
a cathode electrode having a cathode electrode material, wherein
the open pores or channels for delivering oxidant from the oxidant source comprise openings defined by edges of the cathode manifold fabricated within the silicon substrate, and
the openings extend entirely through a thickness of the silicon substrate.

* * * * *

UNITED STATES PATENT AND TRADEMARK OFFICE
CERTIFICATE OF CORRECTION

| | |
|---|---|
| PATENT NO. | : 7,189,471 B2 |
| APPLICATION NO. | : 10/637914 |
| DATED | : March 13, 2007 |
| INVENTOR(S) | : Alan F. Jankowski et al. |

Page 1 of 1

It is certified that error appears in the above-identified patent and that said Letters Patent is hereby corrected as shown below:

On the title page, under Inventors, the first named inventor should read:
Alan F. Jankowski Signed and Sealed this Twenty-sixth Day of February, 2008

JON W. DUDAS
*Director of the United States Patent and Trademark Office*